April 6, 1937. H. DEAL 2,075,793
HORSESHOEING DEVICE
Filed Dec. 20, 1935 2 Sheets-Sheet 1
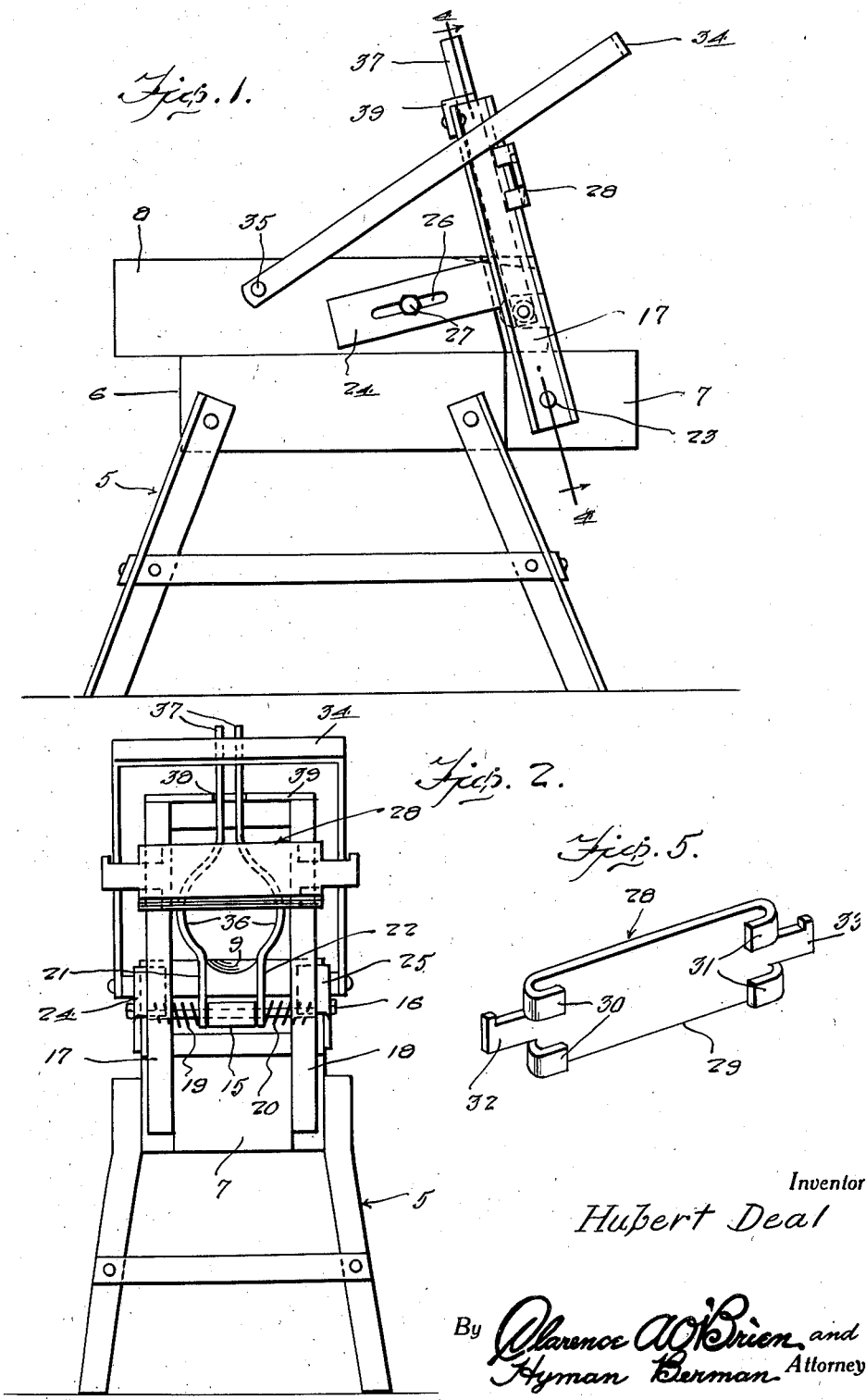
Inventor
Hubert Deal
By Clarence A. O'Brien and
Hyman Berman Attorneys April 6, 1937.                H. DEAL                    2,075,793
                         HORSESHOEING DEVICE
                      Filed Dec. 20, 1935        2 Sheets-Sheet 2

Inventor
Hubert Deal

By Clarence A. O'Brien and
   Hyman Berman
                    Attorneys

Patented Apr. 6, 1937

2,075,793

UNITED STATES PATENT OFFICE 2,075,793

HORSESHOEING DEVICE

Hubert Deal, Marshall, N. C.

Application December 20, 1935, Serial No. 55,467

4 Claims. (Cl. 168—48)

My invention relates generally to apparatus facilitating the shoeing of a horse, and particularly to means for supporting the leg of the horse during the shoeing operations, which means includes arrangements for holding the hoof at the desired angle and applying the hoof cutting device accurately, and an important object of the invention is to provide a simplified and efficient device of this character which is easily and conveniently operated.

Other important objects of my invention will be apparent from a reading of the following description in connection with the drawings, wherein for purposes of illustration I have shown a preferred embodiment of my invention.

In the drawings:—

Figure 1 is a general side elevational view of the embodiment.

Figure 2 is an end elevational view taken looking from right to left in Figure 1.

Figure 3 is a top plan view of Figure 1.

Figure 4 is a transverse vertical sectional view taken through Figure 1 approximately on the line 4—4.

Figure 5 is a perspective view of the sliding knife.

Figure 6 is a perspective view of the hoof rest.

Referring in detail to the drawings, the numeral 5 generally designates a suitable legged frame arranged to rest on the ground and be attached to opposite sides of the block 6 and support the operative parts of the device which include the block 6 having the laterally reduced portion 7 at the right hand end thereof, and the block 8 which is superposed on the block 6 and overhangs the same at the left hand thereof. The right hand end of the upper block 8 stops short of the right hand end of the blocks 6, 7, and the right hand end of the block 8 is formed with a declining concavity 9 designed to receive the hoof of the horse while the leg of the horse is lying along the top of the block 8. The concavity 9 is located in a longitudinal projection 10 which overhangs and is vertically spaced from a wider projection 11. Vertical cut away portions 12 and 13 define angular recesses at the corner of the front of the block 8 at opposite sides of the hoof rest 9, as better shown in Figure 6. The bottom of the projection 10 and the top of the projection 11 and the recess 14 therebetween define a guide for the roller 15 on the shaft 16.

The opposite ends of the shaft 16 pass through vertical side members 17 and 18 on the hoof clamp assembly, and helical springs 19, 20 are interposed between the members 17 and 18 and the corresponding laterally outward side of the clamp members 21 and 22 which are located at opposite sides of the roller 15, as shown in Figure 2, whereby the clamp members 21 and 22 are normally urged toward each other in clamping relation.

The lower ends of the members 17 and 18 are pivoted as indicated by the numerals 23 to opposite sides of the reduced portion of the lower block 6. Lateral brackets 24 and 25 are fastened to the rear side of the members 17 and 18 and have lugs 26 which work on bolts 27 fixed to the opposite sides of the block 8 as shown in Figure 1. The bolts 27 can be tightened to hold the side members 17 and 18 in different vertically angulated positions according to the angle at which the hoof is to be held and the cut made with the knife 28 which is slidable along the side members 17 and 18.

The knife is generally rectangular in form and has a sharp lower edge 29 and a wider upper edge and the opposite ends are provided with pairs of inturned hooks 30 and 31 to slidably fasten the knife in place on the members 17 and 18. Between the pairs of hooks are the L-shaped extensions 32 and 33 which are arranged to be engaged by the legs of the U-shaped lever 34 in the manner indicated in Figure 2 for operating the knife in a downward direction so that the hoof will be sliced or cut at the exactly correct angle.

The U-shaped lever 34 has its legs pivoted as indicated by the numeral 35 to opposite sides of the block 8 to the left of the bolts 27, as clearly shown in Figure 1.

The clamp members 21 and 22 each has the curvedly outset portion 36 which goes around the hoof at opposite sides of the concavity 9, and the upper portions of the clamp sections designated by the numerals 37 are normally closely and parallelly spaced as shown in Figure 2 and kept in this position by notches 38 in the cross member 39 which extends between and is fastened to the upper ends of the members 17 and 18 of the clamp assembly. The upper portions 37 of the clamp sections are swingable toward the right out of the notches 38 when the sections are to be brought around the hoof of the horse, and are restorable to the notches 38 to clamp the hoof in place, the springs 19 and 20 acting to place the pressure of the sections on the hoof and accommodate different sizes of hoofs. The U-shaped lever 34 is long enough to clear the tops of the clamp sections without striking the same in any position of the clamp sections or of the lever 34 and in any position of angulation of the clamp assembly. The top of the block 8 will be angulated according to the wishes of the blacksmith or horse-shoer, and provision for means of adjustment (not shown) may be made for adjusting the angle if desired.

It is to be observed that the roller 15 works in the recess 14 back and forth as the clamp assembly is swung into and out of various adjusted angulated positions.

In employing the device of the invention the same is placed alongside of the horse and the hoof is placed on the platform 8 with the knife-guide leaning to the right from the position shown in Figure 1, and the knife is removed. Then the knife-guide is returned to the position shown in Figure 1 and the hoof clamp slipped over the hoof. The knife-guide is then adjusted so that the knife will slice off the required amount of the hoof when operated.

The knife operating lever is then raised so that the knife can be inserted in the grooves at the top of the knife-guide. The handle ends of the clamp sections are then placed in the notches at the top of the knife-guide with the said lever still erect. With the knife positioned in the grooves, the lever is brought downwardly so as to force the knife through the hoof.

When applying the shoe to the trimmed hoof, the clamp is loosened partly at the top. The knife-guide remains in the erect position, but the clamp is brought forwardly while still engaged with the hoof, and the clamp is re-adjusted so that the shoe can be easily nailed on the hoof. After the shoe has been nailed on, the clamp is loosened and the hoof withdrawn and the horse freed.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A horse-shoeing stand of the character described comprising a hoof support, a clamp frame pivoted on a horizontal axis relative to said support and adapted to assume a vertical operative position, a hoof clamp vertically slidable on said frame, said hoof clamp comprising spring-pressed sections for engaging opposite sides of the hoof.

2. A horse-shoeing stand of the charatcer described comprising a hoof support, a clamp frame pivoted on a horizontal axis relative to said support, means for holding the frame in adjusted position, clamp sections on said frame forming a hoof clamp for clamping the hoof on said hoof support, spring means releasably urging said clamp sections into engagement with opposite sides of the hoof, and a hoof slicing knife mounted on said frame.

3. A horse-shoeing stand of the character described comprising a hoof support, a clamp frame pivoted on a horizontal axis relative to said support, means for holding the frame in a vertical position, hoof clamp members mounted on said frame, and a hoof slicing knife vertically slidably mounted on said frame.

4. A horse-shoeing stand of the character described comprising a hoof support, a hoof clamp frame pivoted on a horizontal axis relative to said support, means for holding the frame in vertically operative position, hoof clamp members mounted on said frame, a hoof slicing knife vertically slidably mounted on said frame, and lever means pivoted on said support and operable into engagement with said knife for operating the knife in the cutting direction.

HUBERT DEAL.